US009572162B2

(12) United States Patent
Koorapaty et al.

(10) Patent No.: US 9,572,162 B2
(45) Date of Patent: *Feb. 14, 2017

(54) AGGREGATED CARRIER SYNCHRONIZATION AND REFERENCE SIGNAL TRANSMITTING AND RECEIVING METHODS, DEVICES AND SYSTEMS

(71) Applicant: Telefonaktiebolaget LM Ericsson (publ), Stockholm (SE)

(72) Inventors: Havish Koorapaty, Saratoga, CA (US); Jung-Fu Cheng, Fremont, CA (US); Daniel Larsson, Solna (SE); Mattias Frenne, Uppsala (SE); Dirk Gerstenberger, Stockholm (SE); Robert Baldemair, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,432

(22) Filed: Mar. 11, 2016

(65) Prior Publication Data
US 2016/0198470 A1  Jul. 7, 2016

Related U.S. Application Data

(63) Continuation of application No. 13/307,835, filed on Nov. 30, 2011, now abandoned.
(Continued)

(51) Int. Cl.
*H04W 72/04* (2009.01)
*H04L 5/00* (2006.01)
(Continued)

(52) U.S. Cl.
CPC .......... *H04W 72/0453* (2013.01); *H04L 5/001* (2013.01); *H04L 5/0048* (2013.01);
(Continued)

(58) Field of Classification Search
CPC ........... H04B 7/00; H04B 7/269; H04B 7/212; H04L 5/001; H04L 5/0007; H04Q 7/20; H04W 4/00; H04W 28/04; H04W 36/06; H04W 36/08; H04W 36/18; H04W 36/30; H04W 52/02; H04W 52/0216; H04W 72/04; H04W 84/12
See application file for complete search history.

(56) References Cited

U.S. PATENT DOCUMENTS

| | | | |
|---|---|---|---|
| 2007/0099616 A1 | 5/2007 | Leelahakriengkrai et al. | |
| 2011/0103333 A1* | 5/2011 | Berggren | ................ H04L 5/001 370/329 |

(Continued)

FOREIGN PATENT DOCUMENTS

| | | |
|---|---|---|
| JP | 2011-071637 A | 4/2011 |
| WO | WO 2010/110526 A1 | 9/2010 |
| WO | WO 2011/000947 A1 | 1/2011 |

OTHER PUBLICATIONS

International Search Report and Written Opinion of the International Searching Authority, PCT/IB2012/053093, Sep. 26, 2012.
(Continued)

*Primary Examiner* — Andrew Lai
*Assistant Examiner* — Leon Andrews
(74) *Attorney, Agent, or Firm* — Myers Bigel, P.A.

(57) ABSTRACT

A node of a wireless network transmits information to a user equipment over an aggregated carrier that includes a primary carrier having a first set of primary carrier time/frequency resources and a secondary carrier having a second set of secondary carrier time/frequency resources. Synchronization signals and/or reference symbols are transmitted to the user equipment on the secondary carrier less often than on the primary carrier. An indication of when and/or how often the synchronization signals and/or reference symbols will be transmitted to the user equipment on the secondary carrier
(Continued)

may also be transmitted to the user equipment over the primary carrier. By transmitting synchronization signals and/or reference symbols to the user equipment on the secondary carrier less often than on the primary carrier, resources of the secondary carrier may be conserved, energy efficiency of the secondary carrier may be increased, and/or interference with other cells may be reduced or prevented.

13 Claims, 8 Drawing Sheets

Related U.S. Application Data

(60) Provisional application No. 61/522,735, filed on Aug. 12, 2011.

(51) Int. Cl.
    *H04W 56/00*     (2009.01)
    *H04W 72/00*     (2009.01)
    *H04L 25/02*     (2006.01)
    *H04L 27/26*     (2006.01)

(52) U.S. Cl.
    CPC .......... *H04L 5/0053* (2013.01); *H04L 5/0078* (2013.01); *H04W 56/00* (2013.01); *H04W 72/00* (2013.01); *H04L 25/0226* (2013.01); *H04L 27/2657* (2013.01); *H04L 27/2662* (2013.01)

(56) References Cited

U.S. PATENT DOCUMENTS

2011/0305179 A1   12/2011   Wang
2012/0020283 A1    1/2012   Chin

OTHER PUBLICATIONS

Ericsson et al.: "On technical aspects on Heterogeneous Networks", 3GPP Draft; R1-100061, 3$^{rd}$ Generation Partnership Project (3GPP), Mobile Competence Centre; 650, Route des Lucioles; F-06921 Sophia-Antipolis Cedex; France, vol. RAN WG1, No. Valencia, Spain; Jan. 12, 2010, XP050417808, [retrieved on Jan. 12, 2010], Sects. 1, 2, Figures 1-3, 4 pp.
Ericsson and ST-Ericsson: "Draft response to incoming RAN1 LS on Carrier Aggregation Types in R1-100828", 3GPP Draft; R4-100568, 3$^{rd}$ Generation Partnership Project (3GPP), Mobile Competence Centre; 650, Route des Lucioles; F-06921 Sophia-Antipolis Cedex; France, vol. RAN WG4, No. San Francisco, USA; Feb. 16, 2010, XP050426026, [retrieved on Feb. 16, 2010], Sect. 2, 8 pp.
TSG RAN WG1: "LS on additional carrier types for LTE-A", 3GPP Draft; R1-100828, 3$^{rd}$ Generation Partnership Project (3GPP), Mobile Competence Centre; 650, Route des Lucioles; F-06921 Sophia-Antipolis Cedex; France, vol. RAN WG1, No. Valencia, Spain; Feb. 5, 2010, XP050489202, [retrieved on Feb. 5, 2010], Sect. 2, 2 pp.
Ericsson et al., "Further details on design principles for additional carrier types", 3GPP Draft; R1-113675, 3$^{rd}$ Generation Partnership Project (3GPP), Mobile Competence Centre; 650, Route des Lucioles; F-06921 Sophia-Antipolis Cedex; France, vol. Ran WG1, No. San Francisco, USA; Nov. 14, 2011-Nov. 18, 2011, Nov. 8, 2011, XP050561812, [retrieved on Nov. 8, 2011], Sects. 2-4, Fig. 1, 4 pp.
Alcatel-Lucent et al.: "Acquisition/synchronization/tracking and RS design for the new carrier type", 3GPP Draft; R1-120484 Additional Carrier Types_RS, 3$^{rd}$ Generation Partnership Project (3GPP), Mobile Competence Centre; 650, Route des Lucioles; F-06921 Sophia-Antipolis Cedex; France, vol. RAN WG1, No. Dresden, Germany; 20120206-2012-0210, Feb. 2, 2012, XP050563318, [retrieved on Feb. 2, 2012], Sects. 2, 3, 3 pp.
Huawei et al.: "Time- and Frequency tracking on additional carrier types", 3GPP Draft; R1-120019, 3$^{rd}$ Generation Partnership Project (3GPP), Mobile Competence Centre; 650, Route des Lucioles; F-06921 Sophia-Antipolis Cedex; France vol. RAN WG1, No. Dresden, Germany Feb. 6, 2012-Feb. 10, 2012, Jan. 31, 2012, XP050562608, [retrieved on Jan. 31, 2012], Sects. 2, 3, 5 pp.
Apple Inc: "On the Configuration and Usage of New Carrier Types", 3GPP Draft; R1-120271, 3$^{rd}$ Generation Partnership Project (3GPP), Mobile Competence Centre; 650, Route des Lucioles; F-06921 Sophia-Antipolis Cedex; France, vol. RAN WG1, No. Dresden, Germany; 2012-0206-20120210, Feb. 1, 2012, XP050563181, [retrieved on Feb. 1, 2012], Sects. 1, 2, 6 pp.
Ericsson et al: "Acquiring synch in CA-based HetNet operations", 3GPP Draft; R1-111773, 3$^{rd}$ Generation Partnership Project (3GPP), Mobile Competence Centre; 650, Route des Lucioles; F-06921 Sophia-Antipolis Cedex; France, vol. RAN WG1, No. Barcelona, Spain; May 9, 2011, May 3, 2011, XP050491358, [retrieved on May 3, 2011], Sect. 4, 3 pp.
International Preliminary Report on Patentability, PCT Application No. PCT/IB2012/053093, Feb. 18, 2014, 12 pg.
Agaur, "Carrier Aggregation for LTE-Advanced" blog entry posted Dec. 12, 2010, retrieved Sep. 14, 2011 from http://lteworld.org/blog/carrier-aggregation-lte-advanced, 2 pp.
Iwamura et al., "Carrier Aggregation Framework in 3GPP LTE-Advanced", *IEEE Communications Magazine*, vol. 48, No. 8, Aug. 2010, pp. 60-67.
Murai et al., "LTE-Advanced—The Solution for IMT-Advanced", Presentation TTA IMT-A WS, Ericcson AB, Jun. 11, 2008, pp. 1-15.
Phan, "Carrier Aggregation Concepts for LTE REL-10", Presentation, Ericsson AB, May 19, 2010.
Ratasuk et al., "Carrier Aggregation in LTD-Advanced" *IEEE 71$^{st}$ Vehicular Technology Conference*, Taipei, May 16-19, 2010, pp. 1-5.
Wang et al., "Spectrum Aggregation: Overview and Challenges", *Network Protocols and Algorithms*, vol. 2, No. 1, Mar. 2010, pp. 184-196.
Japanese Office Action Corresponding to Application No. 2014-525519; Mailing Date: Sep. 6, 2016; Foreign Text, 3 Pages, Engilsh Summary, 1 Page.
Institute for Information Industry (III), Coiier Corporation, "DL Frame Timing in Carrier Aggregation", R1-104869, 3GPP TSG-RAN WG1 #62, Aug. 23-27, 2010, Madrid Spain, 4 Pages.
Huawei: HiSilicon, "Discussion on CA-based HetNet", R1-111381, 3GPP TSG-RAN WG1 Meeting #65, Barcelona, Spain, May 9-13, 2011, 3 Pages.

\* cited by examiner

AGGREGATED CARRIER SYNCHRONIZATION AND REFERENCE SIGNAL TRANSMITTING AND RECEIVING METHODS, DEVICES AND SYSTEMS

CROSS-REFERENCE TO RELATED APPLICATION

This U.S. non-provisional patent application is a continuation of U.S. patent application Ser. No. 13/307,835, filed Nov. 30, 2011; which claims the benefit of U.S. provisional Patent Application No. 61/522,735, filed Aug. 12, 2011, entitled Synchronization and Reference Signals on Aggregated Carriers, the disclosure of which are hereby incorporated herein by reference as if set forth fully herein.

TECHNICAL FIELD

Various embodiments described herein relate to radio frequency communications and, more particularly, to wireless communication networks and devices, and methods of operating the same.

BACKGROUND

Wireless communication networks are increasingly being used for wireless communications with various types of wireless user equipment. The wireless network itself may include a plurality of space-apart wireless base stations, also commonly referred to as "base stations", "radio access nodes", "RAN nodes", "NodeBs", "eNodeBs" or simply as "nodes", that define a plurality of cells, and a core network that controls the base stations and interfaces the base stations with other wired and/or wireless networks. The nodes may be terrestrial and/or space-based. The nodes communicate with wireless User Equipment (UE), also referred to as "user equipment", "wireless terminals" or "mobile stations", using radio resources that are allocated to the wireless network. The radio resources may be defined in terms of time (for example, in a Time Division Multiple Access (TDMA) system), frequency (for example, in a Frequency Division Multiple Access (FDMA) system) and/or code (for example, in a Code Division Multiple Access (CDMA) system). The nodes may use licensed and/or unlicensed frequency spectrum. Radio resources may be assigned to UEs by the wireless network upon initial communication and may be reassigned due to, for example, movement of the UEs, changing bandwidth requirements, changing network traffic, etc.

In many existing wireless cellular communication systems and methods, pilot symbols are transmitted for each antenna or antenna port over radio resource elements that are non-overlapping in time and in frequency with those pilot symbols transmitted for other antennas or antenna ports. For example, in the current release (Rel-10) of Long Term Evolution (LTE) wireless technology, known Reference Symbols (RSs) or pilot symbols are transmitted at various time instants and frequencies for different antenna ports. Using these known RSs, a receiver can estimate the channel response from each transmit antenna to each receive antenna across various times and frequencies.

Moreover, in many existing wireless cellular systems, synchronization signals are also transmitted by nodes in order to allow a UE to find and acquire synchronization to a cell within a radio access network. For example, in the current release (Rel. 10) of LTE, two special signals are transmitted on the LTE downlink: a Primary Synchronization Signal (PSS) and a Secondary Synchronization Signal (SSS). The PSS and SSS may have similar structure, but the time-domain positions of the synchronization signals within a frame may differ somewhat depending on whether the cell is operating in Frequency Division Duplex (FDD) or Time Division Duplex (TDD) mode. In the case of FDD, the PSS is transmitted within the last symbol of the first slot of subframes 0 and 5, while the SSS is transmitted in the second last symbol of the same slot (i.e., just prior to the PSS). In contrast, in the case of TDD, the PSS is transmitted within the third symbol of subframes 1 and 6, while the SSS is transmitted in the last symbol of subframes 0 and 5 (i.e., three symbols ahead of the PSS). Once the UE has detected and identified the PSS of the cell, it has found the timing of the cell and the position of the SSS, which has a fixed offset relative to the PSS, along with the cell identity within a single identity group. From the SSS, the UE may find the frame timing and the cell identity group. The PSS and SSS are collectively referred to herein as "synchronization signals".

LTE allows the aggregation of multiple carriers to send signals between a node and user equipment. The aggregation of carriers in this manner is shown pictorially in FIG. 1. The main carrier is referred to as a primary carrier while the additional carrier is referred to as a secondary carrier. In Rel-10 of LTE, the secondary carrier is generally required to have the features of a regular LTE carrier. That is, it carries synchronization signals for time and frequency synchronization, reference symbols for channel estimation and control signals for data allocations and other control functions much like the primary carrier.

The reuse of carrier frequencies across multiple sites within a cellular network may give rise to interference issues. Additionally, synchronization and reference signals transmitted by nodes in the network may also be wasteful of energy. Interference issues may be especially problematic in so-called "heterogeneous networks" where carrier aggregation is accomplished using micro or pico base stations.

The approaches described in this section could be pursued, but are not necessarily approaches that have been previously conceived or pursued. Therefore, unless otherwise indicated herein, the approaches described in this section are not prior art to claims in this application and any application claiming priority from this application, and are not admitted to be prior art by inclusion in this section.

SUMMARY

Various embodiments described herein operate a node of a wireless network by transmitting information to a user equipment over an aggregated carrier that includes a primary carrier that comprises a first set of primary carrier time/frequency resources and a secondary carrier that comprises a second set of secondary carrier time/frequency resources. Synchronization signals and/or reference symbols are transmitted to the user equipment on the secondary carrier less often than on the primary carrier. In some embodiments, an indication of when and/or how often the synchronization signals and/or reference symbols will be transmitted to the user equipment on the secondary carrier is also transmitted to the user equipment over the primary carrier. By transmitting synchronization signals and/or reference symbols to the user equipment on the secondary carrier less often than on the primary carrier, resources of the secondary carrier may be conserved, energy efficiency of the secondary carrier may be increased, and/or interference with other cells may be reduced or prevented.

Various embodiments can be provided to transmit synchronization signals and/or reference symbols to the user equipment on the secondary carrier less often than on the primary carrier. For example, in some embodiments, the secondary carrier comprises a second set of secondary carrier time/frequency resources that are synchronized in time and frequency with the first set of primary carrier time/frequency resources. In these embodiments, the node refrains from transmitting the synchronization and/or reference signals to the user equipment on the secondary carrier that comprises a second set of secondary carrier time/frequency resources that are synchronized in time and frequency with the first set of primary carrier time/frequency resources. In some embodiments, the second set of secondary carrier time/frequency resources are synchronized in time and frequency with the first set of primary carrier time/frequency resources, but are offset therefrom by a constant time offset and/or constant frequency offset, and an indication of the constant time offset and/or the constant frequency offset is transmitted to the user equipment over the primary carrier. The indication of the constant time offset and/or the constant frequency offset may be transmitted to the user using a Radio Resource Control (RRC) message over the primary carrier, wherein the RRC message includes a parameter that provides the indication of the constant time offset and/or the constant frequency offset. Moreover, when the primary carrier and the secondary carrier are co-sited, the node can refrain from transmitting synchronization signals and reference symbols to the user equipment on the secondary carrier.

In other embodiments, the secondary carrier comprises a second set of secondary carrier time/frequency resources that are synchronized in time with the first set of primary carrier time/frequency resources, but are in a different frequency band than the first set of primary carrier time/frequency resources. The primary carrier and the secondary carrier may be co-sited. In these embodiments, the reference symbols are transmitted to the user equipment on the secondary carrier less often on the primary carrier. Moreover, in some embodiments, the node refrains from transmitting synchronization signals to the user equipment on the secondary carrier. In some embodiments, an indication of when the reference symbols will be transmitted to the user equipment on the secondary carrier is transmitted by the node to the user equipment over the primary carrier. Moreover, in some embodiments, the reference symbols are transmitted to the user equipment on the secondary carrier at a periodicity that is lower than that of the primary carrier, and an indication of the periodicity (i.e., how often) is transmitted to the user equipment over the primary carrier.

In still other embodiments, the secondary carrier comprises a second set of time/frequency resources that are not synchronized in time with the first set of primary carrier time/frequency resources and are also in a different frequency band than the first set of primary carrier time/frequency resources. The primary carrier and the secondary carrier may not be co-sited. In these embodiments, the synchronization signals and the reference symbols are transmitted to the user equipment on the secondary carrier less often than on the primary carrier. Moreover, at least one indication of when and/or how often the synchronization signals and/or the reference symbols will be transmitted to the user equipment on the secondary carrier is transmitted by the node to the user equipment over the primary carrier. In some embodiments, both the synchronization signals and the reference symbols are transmitted to the user equipment on the secondary carrier at a periodicity that is lower than that of the primary carrier, and at least one indication of the periodicity of transmitting the synchronization signals and/or the reference symbols is transmitted from the node to the user equipment over the primary carrier. In some embodiments, the at least one indication is transmitted over the primary carrier as a parameter of an RRC message.

Various embodiments have been described above primarily in connection with methods of operating a node of the wireless communications network. However, other embodiments can provide the node itself. The node comprises at least one transmitter that is configured to transmit information to a user equipment over an aggregated carrier that includes a primary carrier that comprises a first set of primary carrier time/frequency resources and a secondary carrier that comprises a second set of secondary carrier time/frequency resources. The at least one transmitter may be further configured to transmit synchronization signals and/or reference symbols to the user equipment on the secondary carrier less often on the primary carrier, according to any of the embodiments that were described above.

Moreover, other nodes of a wireless communication network may be provided according to other embodiments described herein. In these embodiments, the at least one transmitter is configured to transmit information to a user equipment over an aggregated carrier that includes a primary carrier that comprises a first set of primary carrier time/frequency resources and a secondary carrier that comprises a second set of secondary carrier time/frequency resources. The at least one transmitter is further configured to transmit synchronization signals and/or reference symbols to the user equipment over the primary carrier. The at least one transmitter is still further configured to transmit to the user equipment over the primary carrier, information about synchronization signals and/or reference symbols of the secondary carrier. The information may comprise an indication of when the synchronization signals and/or the reference symbols will be transmitted to the user equipment on the secondary carrier and/or an indication of a periodicity (i.e., how often) of transmitting the synchronization signals and/or the reference symbols to the user equipment on the secondary carrier. Analogous methods of operating a node may also be provided according to various embodiments described herein.

Various other embodiments described herein may provide methods of operating a user equipment of a wireless communications network. These methods may include receiving information over an aggregated carrier that includes a primary carrier that comprises a first set of primary carrier time/frequency resources and a secondary carrier that comprises a second set of secondary carrier time/frequency resources. Synchronization signals and/or reference symbols may also be received over the primary carrier, and the synchronization signals and/or reference symbols that were received over the primary carrier may be processed. Moreover, synchronization signals and/or reference symbols are received over the secondary carrier less often than on the primary carrier. The synchronization signals and/or the reference symbols that were received over the secondary carrier less often than the primary carrier are also processed by the user equipment.

These methods of operating a user equipment may further include receiving over the primary carrier an indication of how often the synchronization signals and/or reference symbols will be received on the secondary carrier. The indication may include at least one indication of when the synchronization signals and/or the reference symbols will be received on the secondary carrier and/or at least one indication of a periodicity (i.e., how often) of receiving the synchronization signals and/or the reference symbols on the secondary carrier. The at least one indication may be received over the primary carrier as a parameter of an RRC message. Moreover, analogous user equipment may also be provided that includes at least one transmitter that is configured to receive information over an aggregated carrier that includes a primary carrier that comprises a first set of primary carrier time/frequency resources and a secondary carrier that comprises a second set of secondary carrier time/frequency resources. The transmitter may also be further configured to receive and process the synchronization signals and/or reference symbols over the primary carrier and to receive and process synchronization signals and/or reference symbols over the secondary carrier less often than on the primary carrier, as was described above.

DETAILED DESCRIPTION

Figure 1:
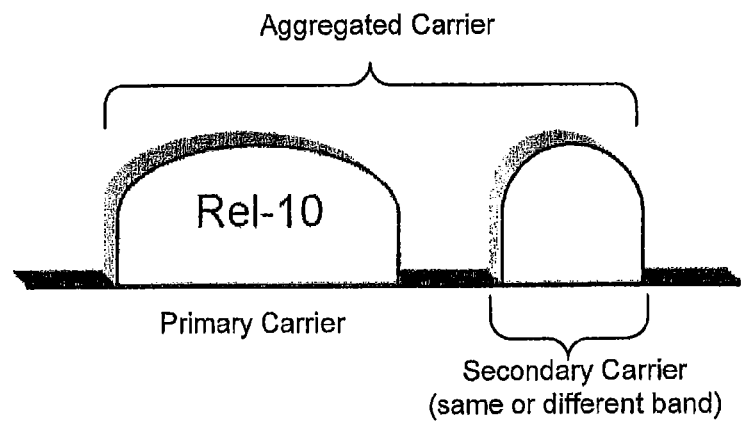
FIG. 1 conceptually illustrates an aggregated carrier in Release 10 (Rel-10) of LTE.

Various embodiments described herein transmit synchronization signals and/or reference symbols from a node to user equipment on a secondary carrier of an aggregated carrier less often than on the primary carrier of the aggregated carrier. Moreover, an indication of when and/or how often the synchronization signals and/or reference symbols will be transmitted to the user equipment on the secondary carrier may also be transmitted by the node to the user equipment over the primary carrier. The user equipment may receive and process synchronization signals and/or reference symbols over the primary carrier and may also receive synchronization signals and/or reference symbols over the secondary carrier less often than on the primary carrier, and process these synchronization signals and/or reference symbols.

Various embodiments described herein may arise from a recognition that in the current release of LTE, the secondary carrier is generally required to have the features of the regular LTE carrier. That is, it carries synchronization signals for time and frequency synchronization, reference symbols for channel estimation and control signals for data allocations and other control functions, much like the primary carrier. In future releases of LTE, however, it is proposed to allow the secondary carrier to have non-backward compatible features. Therefore, changes could potentially be made as to how synchronization signals and other signals are transmitted on the secondary carrier.

Moreover, various embodiments described herein may also arise from recognition that LTE can be deployed in multiple ways. In one type of deployment, most of the base stations in the network are so-called macro base stations and have similar transmit powers and antenna gains. In another type of deployment, commonly referred to as heterogeneous networks, there may be two or more tiers of base stations, with the main tier being a set of macro base stations and the secondary tiers being micro and/or pico base stations. The micro and pico base stations typically have lower transmit powers and therefore smaller cell ranges. With judicious placement of pico and micro cells, the overall network capacity can be increased.

Various embodiments described herein may also arise from recognition that, under low load conditions, i.e., when there are very few UEs receiving data, most of the signals transmitted in the network are control signals such as synchronization signals and reference symbols. Under low load conditions, the interference among these signals from multiple sites may limit system capacity. The challenges in deploying heterogeneous networks often revolve around such interference between the macro and micro/pico layers of the network. In many cases the reception of synchronization and reference signals transmitted from a pico base station is inhibited due to interference from similar signals at the macro base station. Thus, even though data could be received from the pico base station, the interference on synchronization and other signals may impede reception of data at the UE from the pico base station.

Energy efficiency of broadband wireless networks is also becoming increasingly important. In some scenarios, about 90% of the energy in a wireless network is consumed when no user is receiving data. Various embodiments described herein may also arise from recognition that the periodic transmission of synchronization and reference signals from a base station, even when no users are in the system, is one of the key contributors to power consumption in LTE networks.

Given the issues of energy efficiency and interference with current homogeneous and heterogeneous LTE networks, various embodiments described herein can provide synchronization signals and reference symbols for secondary carriers in a carrier aggregation situation, while mitigating one or more of the issues listed above, and/or other issues. Reference symbols for channel estimation purposes can be transmitted within data allocations that are made to a UE to transfer control or data messages in order to combat one or more of the of the above issues.

Existing solutions for synchronization signals and reference symbols that are intended to be used by multiple UEs generally use some form of periodic transmission. That is, these signals/symbols appear at regular intervals, and the UEs in the system use knowledge of the periodicity for various purposes including deriving frame timing and maintaining time and frequency synchronization. Various embodiments described herein may arise from recognition that a problem with such solutions is that the periodic transmission of these signals occurs whether there are any UEs that are attempting to use the signals/symbols. This can lead to energy inefficiency as well as unnecessary interference to other cells, whether in a homogeneous or heterogeneous deployment.

Various embodiments described herein address the transmission of synchronization and reference signals on a secondary carrier in a carrier aggregation deployment where a primary carrier is also being transmitted. In some embodiments, it is assumed that the primary carrier is an LTE compliant carrier with synchronization and reference signals being transmitted with the periodicity as defined in the LTE specifications.

Various embodiments described herein can overcome one or more of the issues described above, for example, by avoiding transmission of synchronization signals and/or reference symbols when there are no active UEs in the system. When UEs are actively using the secondary carrier, the transmission of these signals/symbols may be signaled explicitly on the primary carrier. This allows synchronization signals and reference symbols to be scheduled just like data transmissions. This may be contrasted with the current release of LTE, where typically, transmission of such signals/symbols occurs in a fixed manner. This flexibility in scheduling or suppressing the transmission of these signals/symbols can lead to an increased ability to manage interference in the network during low load conditions, which can increase system performance. It can also allow the wireless network to be more energy efficient.

Figure 2:
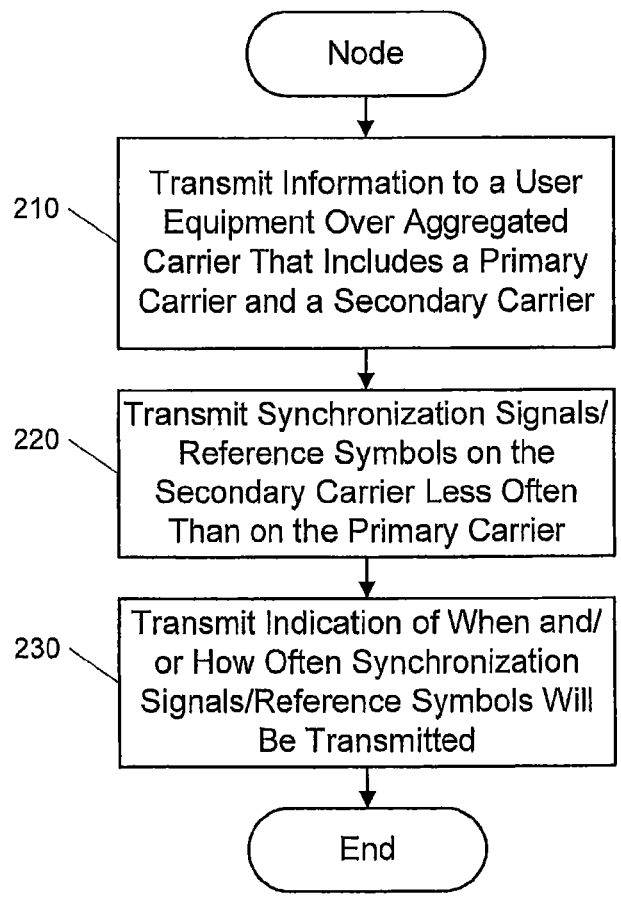
FIG. 2 is a flowchart of operations that may be performed to operate a node of a wireless communications network according to various embodiments described herein.

FIG. 2 is a flowchart of operations that may be performed to operate a node of a wireless communications network according to various embodiments described herein. Referring to FIG. 2, at Block 210, a node of a wireless communications network can operate by transmitting information to a user equipment over an aggregated carrier that includes a primary carrier that comprises a first set of primary carrier time/frequency resources and a secondary carrier that comprises a second set of secondary carrier time/frequency resources. At Block 220, synchronization signals and/or reference symbols are transmitted to the user equipment on the secondary carrier less often than on the primary carrier. Moreover, at Block 230, in some embodiments, an indication of when and/or how often the synchronization signals and/or reference symbols will be transmitted to the user equipment on the secondary carrier may also be transmitted to the user equipment over the primary carrier.

Figure 3:
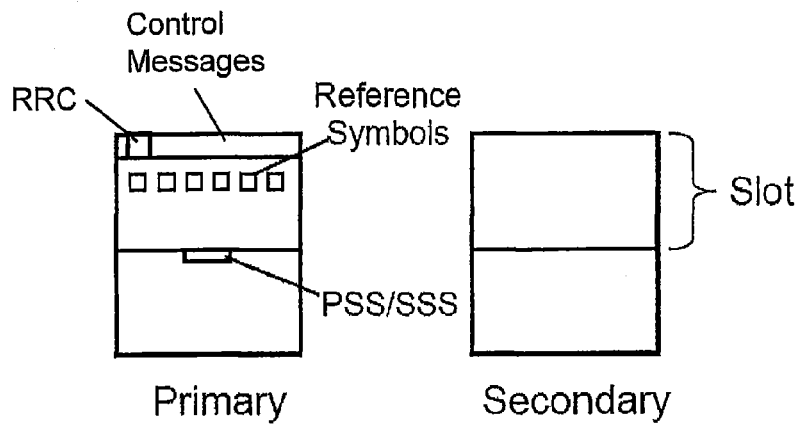
FIG. 3 illustrates a frame of a primary carrier and a secondary carrier of an aggregated carrier that is configured to operate according to various embodiments described herein.

FIG. 3 illustrates a frame of a primary carrier and a secondary carrier of an aggregated carrier that is configured to operate according to various embodiments described herein. The primary and the secondary carriers may be transmitted from the same cell site (i.e., co-sited) and may be synchronized in time and frequency. In this scenario, according to various embodiments described herein, no synchronization or reference signals need be transmitted on the secondary carrier. Specifically, as shown in FIG. 3, the primary carrier may transmit a primary synchronization signal and/or a secondary synchronization signal (PSS/SSS) in a given slot of the primary carrier. Reference Symbols (RS) may also be transmitted as shown. Control messages may also be transmitted including a Radio Resource Control (RRC) message.

The UE obtains initial time and frequency synchronization and subsequently maintains synchronization using the synchronization signal (PSS/SSS) and/or other reference symbols if available on the primary carrier. Note that the actual carrier frequencies and frame timings may be different. This synchronization may be maintained if the offset between the carrier frequencies and frame timings on the primary and secondary carriers is constant. Knowledge of these constant offsets allows the UE to operate on the secondary carrier after synchronization is performed with the primary carrier. The offset parameters may be signaled to the UEs using control signaling on the primary carrier, such as the RRC message.

Mobility measurements may also be performed by the UE using the PSS/SSS (synchronization signals) or the reference symbols on the primary carrier. Such measurements are used to determine if a handoff is desired from the current service cell to a different cell. Since the carriers are co-sited, and assuming that the transmitted power spectral density is the same on both carriers, measurements on the primary carrier are sufficient for a UE not currently on the primary or secondary carrier to decide if it should move to the cell.

Figure 4:
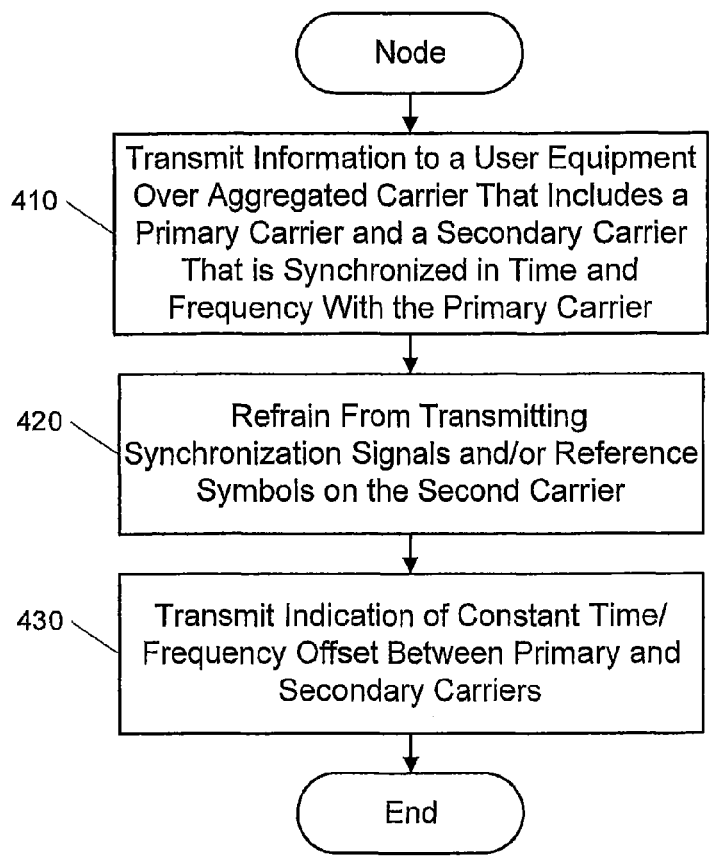
FIG. 4 is a flowchart of operations that may be performed by a node using a primary and a secondary carrier that are configured, for example, as illustrated in FIG. 3.

FIG. 4 is a flowchart of operations that may be performed by a node using a primary and a secondary carrier that are configured, for example, as illustrated in FIG. 3. Blocks 410-430 of FIG. 4 may correspond to the operations of Blocks 210-230 of FIG. 2, respectively, but are performed using the primary and secondary carriers of FIG. 3.

Referring to Block 410, information is transmitted to the user equipment over the aggregated carrier that includes a primary carrier that comprises a first set of primary carrier time/frequency resources and a secondary carrier that comprises a second set of secondary carrier time/frequency resources that are synchronized in time and frequency with the first set of primary carrier time/frequency resources. At Block 420, the node refrains from transmitting synchronization signals and/or reference symbols to the user equipment on the secondary carrier that comprises a second set of secondary carrier time/frequency resources that are synchronized in time and frequency with the first set of primary carrier time/frequency resources. In some embodiments, at Block 430, the second set of secondary carrier time/frequency resources are synchronized in time and frequency with the first set of primary carrier time/frequency resources, but are offset therefrom by a constant time offset and/or a constant frequency offset, and the node can transmit to the user equipment over the primary carrier, an indication of the constant time offset and/or the constant frequency offset.

In some embodiments, the indication of Block 430 is transmitted using an LTE RRC message over the primary carrier, that includes a parameter that provides the indication of the constant time offset and/or the constant frequency offset. Finally, in some embodiments of FIG. 4, the primary carrier and the secondary carrier are co-sited, and the node refrains from transmitting both the synchronization signals and the reference symbols to the user equipment on the secondary carrier.

Figure 5:
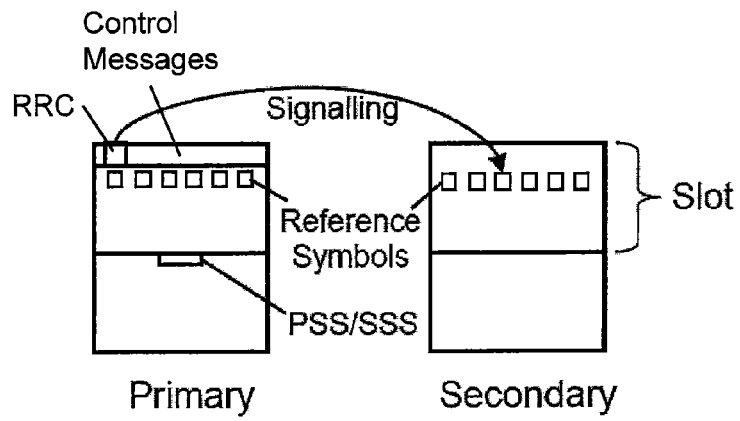
FIG. 5 illustrates a frame of a primary carrier and a secondary carrier of an aggregated carrier that is configured to operate according to various other embodiments described herein.

FIG. 5 illustrates a frame of a primary carrier and a secondary carrier of an aggregated carrier that is configured to operate according to various other embodiments described herein. Embodiments of FIG. 5 may differ from embodiments of FIG. 3 in the fact that the two carriers are in different bands. In such situations, it is possible that the propagation characteristics of each of the bands are different. For example, the primary carrier may be in the 1900 MHz band while the secondary carrier may be in the 700 MHz band. In such situations, it may be desirable for mobility measurements to be made on the secondary carrier itself rather than deriving mobility measurements from the primary carrier. Thus, as illustrated in FIG. 5, according to various embodiments described herein, reference symbols are transmitted on the secondary carrier, and are signaled from the primary carrier, as shown, for example, by "Signaling" of FIG. 5. In other embodiments, the reference symbols are transmitted with a periodicity (for example, every X number of subframes) that is configurable and is signaled to the UE(s) from the primary carrier, as shown, for example, by "Signaling" of FIG. 5.

The UE may obtain time and frequency synchronization as in embodiments of FIGS. 3 and 4. For mobility measurements, the UE first receives control signaling on the primary carrier indicating that the reference symbols that can be used for mobility measurements are going to be transmitted on the secondary carrier. The UE then receives the reference symbols on the secondary carrier and uses them to perform mobility measurements.

The location of the reference symbols in the secondary carrier can be indicated in many ways. For example, in some embodiments, the offset between the time of signaling on the primary carrier and the transmission of the reference symbols on the secondary carrier (in terms of subframes or OFDM symbols) may be signaled. In other embodiments, the subframe number on the secondary carrier in which the reference symbols are going to be transmitted is explicitly included in the signaling. Other techniques may be used.

Figure 6:
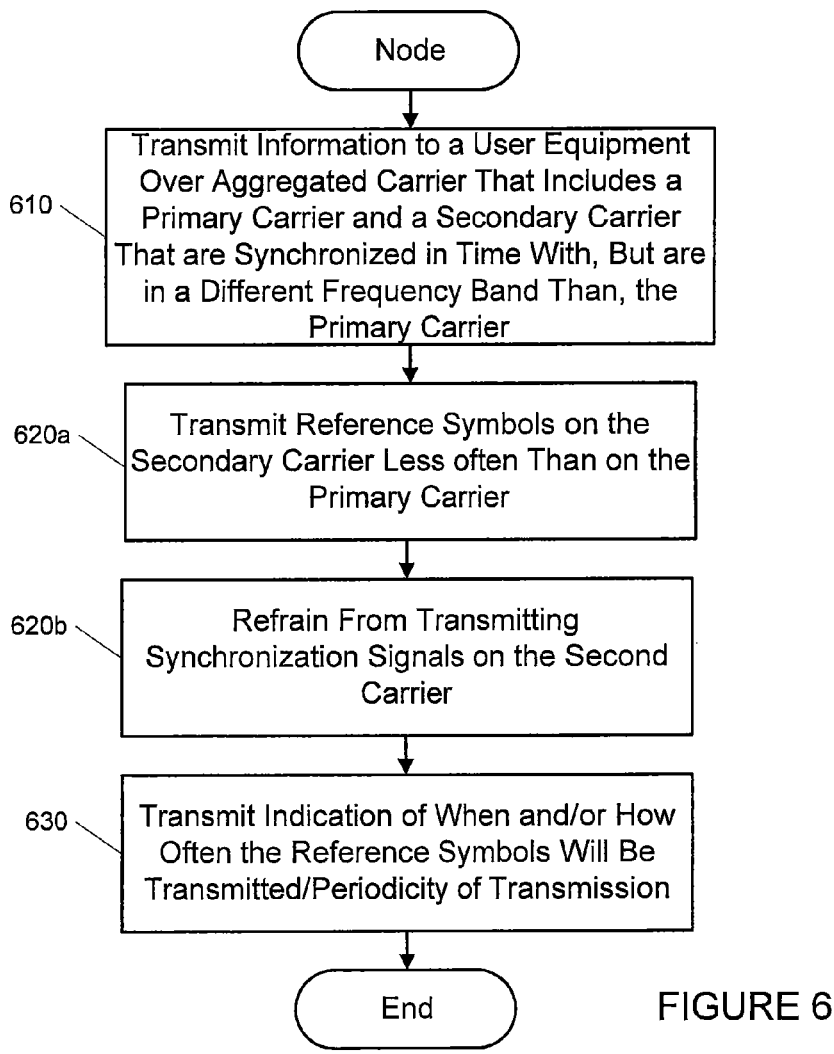
FIG. 6 is a flowchart of operations that may be performed by a node using a primary and a secondary carrier that are configured, for example, as illustrated in FIG. 5.

FIG. 6 is a flowchart of operations that may be performed by a node using a primary and a secondary carrier that are configured, for example, as illustrated in FIG. 5. Blocks 610-630 of FIG. 6 may correspond to the operations of Blocks 210-230 of FIG. 2, respectively, but are performed using the primary and secondary carriers of FIG. 5.

More specifically, referring to FIG. 6, at Block 610, information is transmitted to the user equipment over an aggregated carrier that includes a primary carrier that comprises a first set of primary carrier time/frequency resources and a secondary carrier that comprises a second set of secondary carrier time/frequency resources that are synchronized in time with the first set of primary carrier time/frequency resources but are in a different frequency band than the first set of primary carrier time/frequency resources. As shown at Block 620*a*, reference symbols are transmitted to the user equipment on the secondary carrier less often than on the primary carrier. Moreover, as shown at Block 620*b*, synchronization signals are refrained from being transmitted (i.e., are not transmitted) on the secondary carrier. Finally, as shown at Block 630, an indication of when and/or how often the reference symbols will be transmitted to the user equipment on the secondary carrier may also be transmitted to the user equipment over the primary carrier. In some embodiments, at Block 630, the reference symbols are transmitted to the user equipment on the secondary carrier at a periodicity that is lower than that of the primary carrier, and an indication of the periodicity is transmitted.

Figure 7:
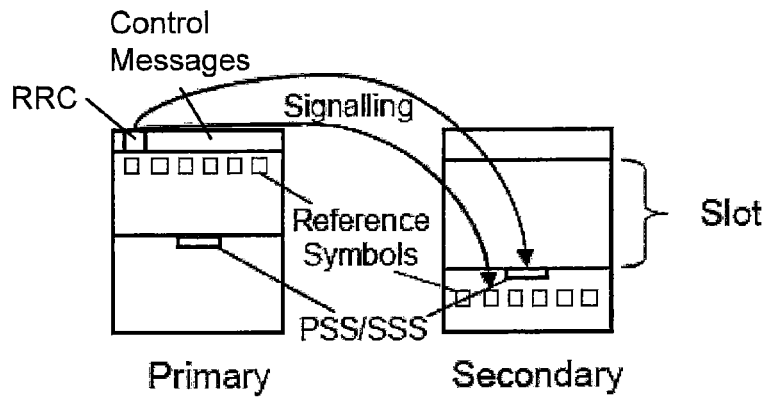
FIG. 7 illustrates a frame of a primary carrier and a secondary carrier of an aggregated carrier that is configured to operate according to still other embodiments described herein.

FIG. 7 illustrates a frame of a primary carrier and a secondary carrier of an aggregated carrier that is configured to operate according to still other embodiments described herein. In embodiments of FIG. 7, the primary and secondary carriers may not be synchronized in time and frequency or may be transmitted from different sites. In this case, according to various embodiments described herein, both synchronization signals and reference symbols are sent over the secondary carrier and are explicitly signaled from the primary carrier when they are sent. In other embodiments, the synchronization signals and reference symbols are sent periodically over the secondary carrier, with the periodicity being configurable and being signaled by the primary carrier. The periodicities of the synchronization signals and reference symbols may be different.

As shown in FIG. 7, the UE obtains time and frequency synchronization by first synchronizing to the primary carrier and receiving signaling on the primary carrier that indicates the location of the synchronization signals and reference symbols on the secondary carrier. The UE then uses the PSS/SSS sequence on the secondary carrier to perform initial synchronization or to maintain synchronization. The UE also uses the reference symbols on the secondary carrier when needed for mobility measurements. The signaling of the locations of the secondary carrier reference symbols and/or synchronization signals can be performed, for example, as was described in connection with FIG. 5.

Figure 8:
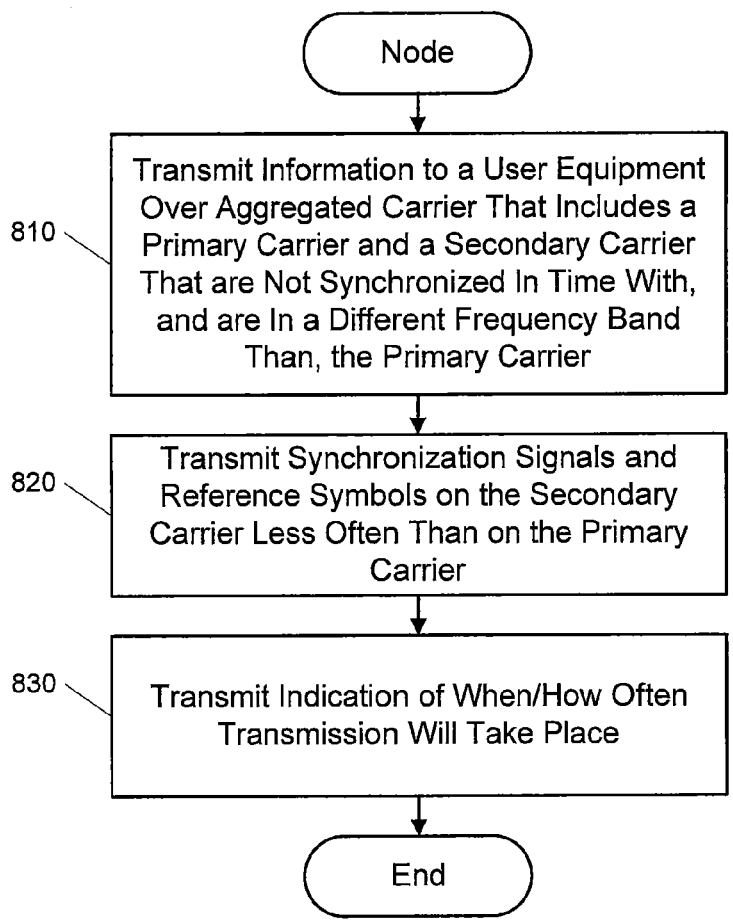
FIG. 8 is a flowchart of operations that may be performed by a node using a primary and a secondary carrier that are configured, for example, as illustrated in FIG. 7.

FIG. 8 is a flowchart of operations that may be performed by a node using a primary and a secondary carrier that is configured, for example, as illustrated in FIG. 7. Blocks 810-830 of FIG. 8 may correspond to the operations of Blocks 210-230 of FIG. 2, respectively, but are performed using the primary and secondary carriers of FIG. 7.

Referring to FIG. 8, at Block 810, information is transmitted to the user equipment over an aggregated carrier that includes a primary carrier that comprises a first set of primary carrier time/frequency resources and a secondary carrier that comprises a second set of secondary carrier time/frequency resources that are not synchronized in time with the first set of primary carrier time/frequency resources and that also are in a different frequency band than the first set of primary carrier time/frequency resources. At Block 820, synchronization signals and reference symbols are transmitted to the user equipment on the secondary carrier less often than on the primary carrier. In some embodiments, at Block 830, an indication of when and/or how often the synchronization and/or the reference symbols will be transmitted to the user equipment on the secondary carrier is transmitted to the user equipment over the primary carrier. Moreover, in some embodiments, the synchronization signals and the reference symbols are transmitted to the user equipment on the secondary carrier at a periodicity that is lower than that of the primary carrier, and operations of Block 830 transmit to the user equipment over the primary carrier at least one indication of the periodicity of transmitting the synchronization signals and/or the reference symbols, to indicate how often transmission will take place.

Figure 9:
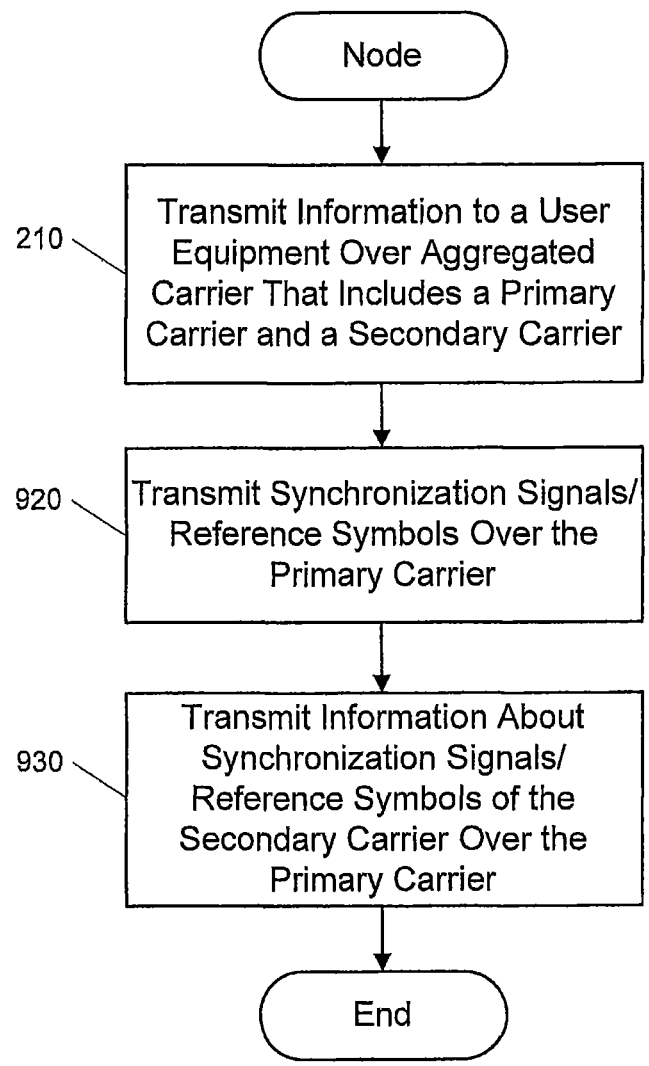
FIG. 9 is a flowchart of operations that may be performed by a node according yet other embodiments described herein.

FIG. 9 is a flowchart of operations that may be performed by a node of a wireless communications network according to yet other embodiments described herein. In these embodiments, secondary carrier synchronization signal/reference symbol signaling may be transmitted from the primary carrier as was illustrated in FIGS. 5 and 7 for any purpose.

Referring to FIG. 9, at Block 210, information is transmitted to a user equipment over an aggregated carrier that includes a primary carrier that comprises a first set of primary carrier time/frequency resources and a secondary carrier that comprises a second set of secondary carrier time/frequency resources. At Block 920, synchronization signals and/or reference symbols are transmitted to the user equipment over the primary carrier. Moreover, at Block 930, information about synchronization signals and/or reference symbols of the secondary carrier are transmitted to the user equipment over the primary carrier. In some embodiments, the information about synchronization signals and/or reference symbols of the secondary carrier comprises an indication of when the synchronization signals and/or the reference symbols will be transmitted to the user equipment on the secondary carrier and/or an indication of a periodicity (i.e., how often) of transmitting the synchronization signals and/or the reference symbols to the user equipment on the secondary carrier. Finally, in some embodiments, the synchronization signals and/or reference symbols are transmitted over the secondary carrier based on the information that was transmitted in Block 930. The transmission on the secondary carrier may be performed by the same transmitter that performs the operations of FIG. 9 and/or by a different transmitter.

Figure 10:
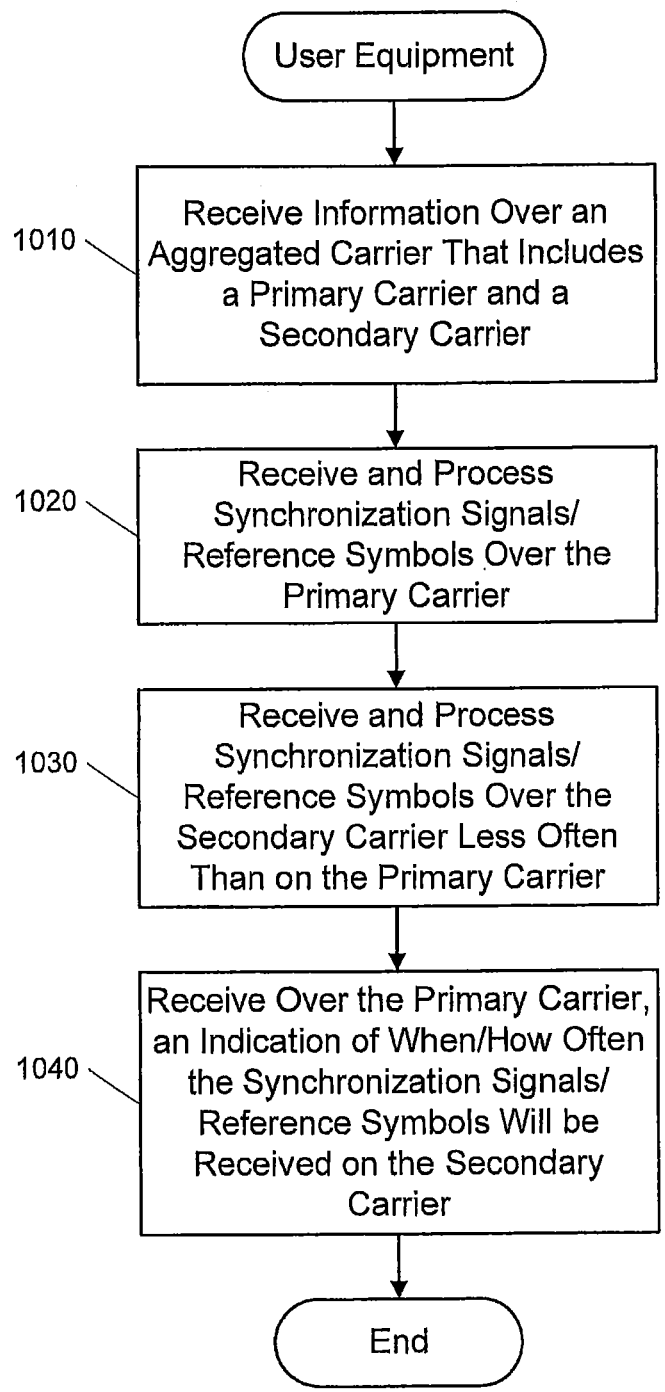
FIG. 10 is a flowchart of operations that may be performed by a user equipment of a wireless communications network according to various embodiments described herein.

FIG. 10 is a flowchart of operations that may be performed by a user equipment according to various embodiments described herein. Specifically, referring to Block 1010, the user equipment receives information over an aggregated carrier that includes a primary carrier that comprises a first set of primary carrier time/frequency resources and a secondary carrier that comprises a second set of secondary carrier time/frequency resources. At Block 1020, the user equipment receives and processes synchronization signals and/or reference symbols over the primary carrier. At Block 1030, the user equipment receives and processes synchronization signals and/or reference symbols over the secondary carrier less often than on the primary carrier and processes the synchronization signals and/or the reference symbols that were received over the secondary carrier less often than on the primary carrier. In some embodiments, at Block 1040, the user equipment also receives, over the primary carrier, an indication of when and/or how often the synchronization signals and/or reference symbols will be received on the secondary carrier. In some embodiments, the indication comprises at least one indication of when the synchronization signals and/or the reference symbols will be received on the secondary carrier and/or of a periodicity of receiving the synchronization signals and/or the reference symbols on the secondary carrier.

FIGS. 5 and 7 illustrated signaling that may be provided according to various embodiments described herein, as was described, for example, at Blocks 230, 430, 630, 830, 930 and 1040 herein. Various embodiments of this signaling will now be described. For example, signaling described herein may be performed using one or more parameters of an RRC message, one or more parameters that are signaled by an L1 control channel, using implicit signaling and/or using other signaling mechanisms that may be provided, for example, by LTE.

The RRC message can be provided by a broadcast RRC message and/or a dedicated RRC message to each specific UE in that primary cell. When the RRC parameters are sent via broadcast message, the RRC parameters can either be signaled through one of the System Information Blocks (SIBs) that are transmitted for sending control information or can be included in the messages sent on the Physical Broadcast CHannel (PBCH) that is received by the UEs before receiving information in the SIBs. Also, RRC parameters sent via dedicated messages may be common to all UEs that utilize the information and are attached to the same cells.

In other embodiments, one or more parameters may be signaled by an L1 control channel. In still other embodiments, implicit signaling may be used. The implicit signaling can, for example, be derived based on one or more of the following applicable parameters: Physical Cell Indicator (PCI), a parameter that defines the transmission point, OFDM symbol number, slot number, subframe number, radio frame number, etc. Various other signaling techniques may be provided, and various embodiments described herein should not be construed as limited to the above techniques.

Various embodiments described herein can enhance energy efficiency. By suppressing the transmission of synchronization signals and/or reference symbols according to various embodiments described herein, energy efficiency can be enhanced. When synchronization signals and/or reference symbols are to be transmitted, the transmission can be either signaled and/or their periodicity can be signaled. Such configurability allows the system to reduce or minimize transmission of these signals/symbols during times of low or no load, thus reducing power consumption and increasing energy efficiency.

Moreover, system performance may be improved through interference management. Specifically, various embodiments described herein can allow synchronization signals and/or reference symbols to either not be transmitted on the secondary carrier or to effectively be scheduled just like other data transmissions. This flexibility in scheduling or suppressing the transmission of these signals/symbols can lead to an increased ability to manage interference in the network during low load conditions, thus increasing system performance.

Additional discussion of various embodiments described herein will now be provided. Although various embodiments described herein may be implemented in any appropriate type of telecommunication system supporting any suitable communication standards using any suitable components, particular embodiments of the described solutions may be implemented in an LTE network, such as that illustrated in FIG. 11.

Figure 11:
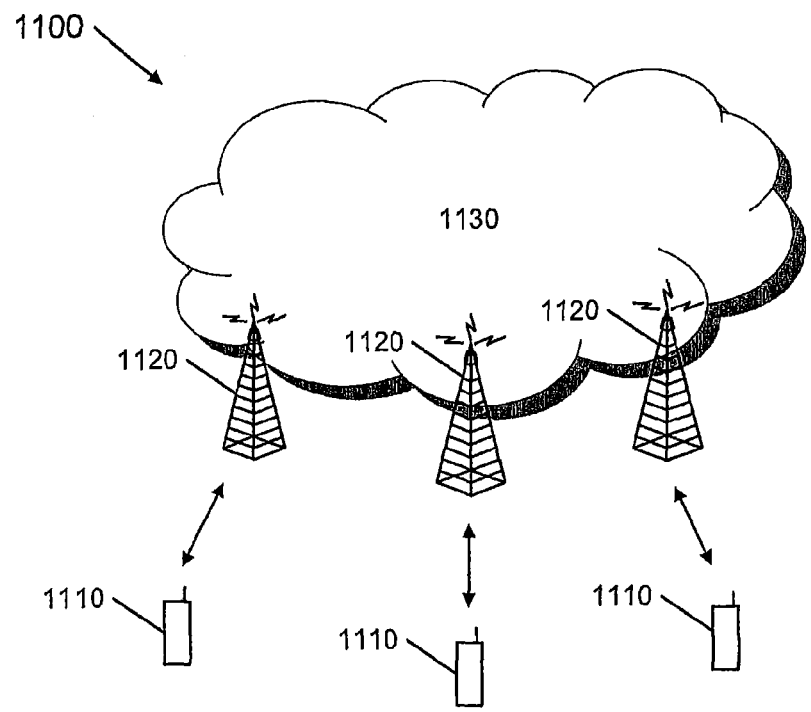
FIG. 11 is a block diagram of a wireless network according to various embodiments described herein.

As shown in FIG. 11, an example network 1100 may include one or more instances of UEs 1110 and one or more nodes 1120 capable of communicating with these UEs, along with any additional network elements 1130 suitable to support communication between UEs or between a UE and another communication device (such as a landline telephone). Although the illustrated UEs 1110 may represent communication devices that include any suitable combination of hardware and/or software, these UEs may, in particular embodiments, represent devices such as the example UE illustrated in greater detail by FIG. 12. Similarly, although the illustrated nodes 1120 may represent network nodes that include any suitable combination of hardware and/or software, these nodes may, in particular embodiments, represent devices such as the example nodes illustrated in greater detail by FIG. 13.

Figure 12:
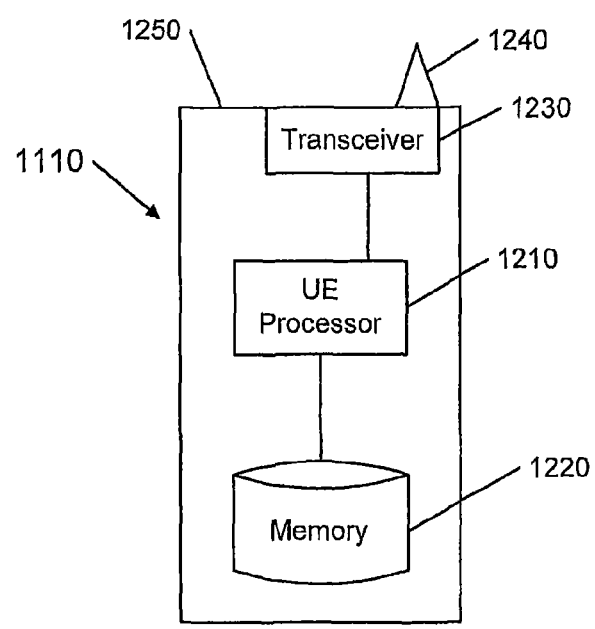
FIG. 12 is a block diagram of a user equipment according to various embodiments described herein.

As shown in FIG. 12, the example UE 1110 includes a UE processor 1210, a memory 1220, a transceiver 1230, an antenna 1240 and a housing 1250. In particular embodiments, some or all of the functionality described above as being provided by a UE may be provided by the UE processor 1210 executing instructions stored on a computer-readable medium, such as the memory 1220 shown in FIG. 12. Alternative embodiments of the UE may include additional components beyond those shown in FIG. 12 that may be responsible for providing certain aspects of the UE's functionality, including any of the functionality described above and/or any functionality necessary to support the solution described above.

Figure 13:
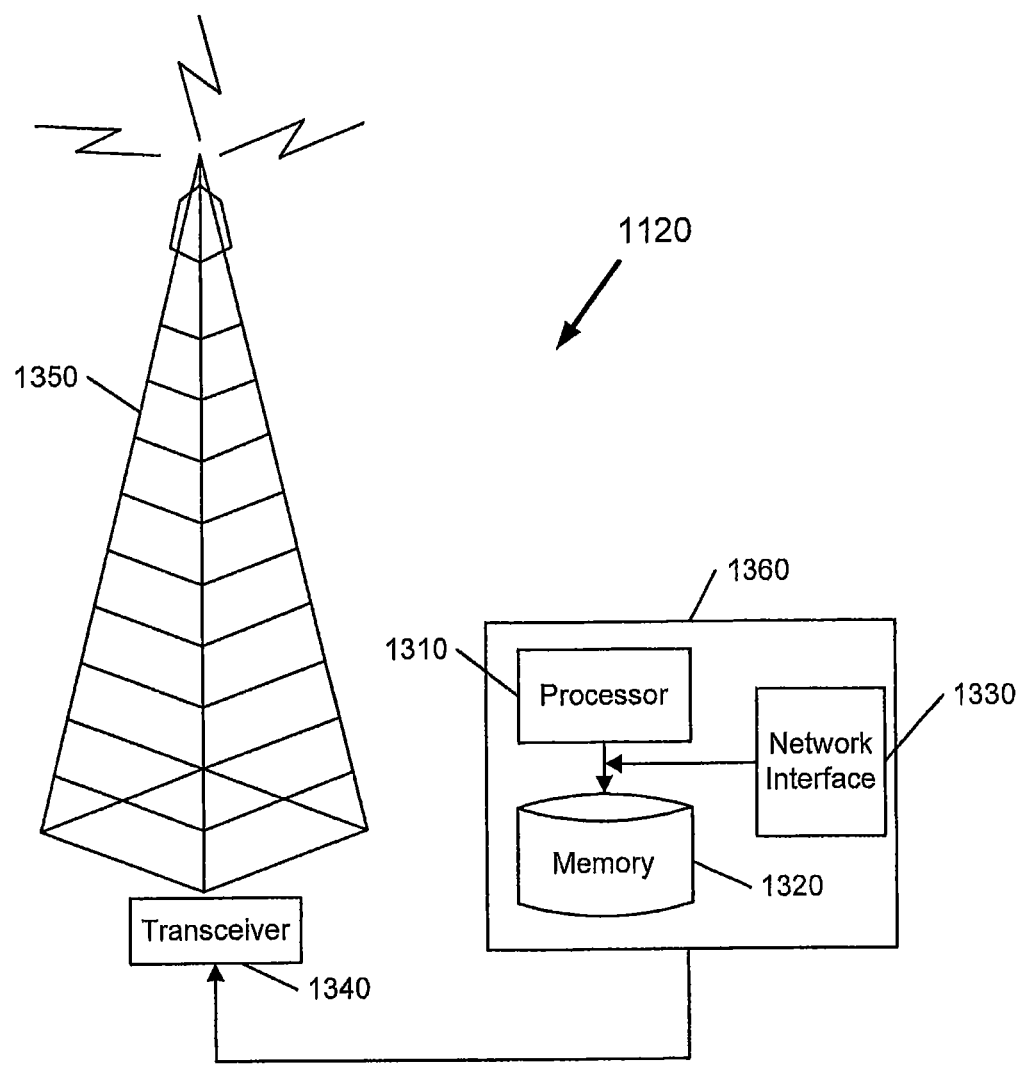
FIG. 13 is a block diagram of a node according to various embodiments described herein.

As shown in FIG. 13, the example node 1120 includes a processor 1310, a memory 1320, a transceiver 1340, an antenna 1350 and a housing 1360. In particular embodiments, some or all of the functionality described above as being provided by a home base station, an HeNB, an HNB, a pico/femto base station, a base station controller, a node B, an eNB, and/or any other type of mobile communications node may be provided by the node 1120 executing instructions stored on a computer-readable medium, such as the memory 1320 shown in FIG. 13. Accordingly, a node according to various embodiments described herein can include a wireless transceiver 1340 that is configured to wirelessly communicate with wireless User Equipment, such as the wireless User Equipment of FIG. 12, a network interface 1330 that is configured to establish a communication path to an element of a network 1130, and a processor 1310. Alternative embodiments of the node 1120 may include additional components responsible for providing additional functionality, including any of the functionality identified above and/or any functionality necessary to support the solution described above.

Various embodiments were described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Various embodiments described herein can operate in any of the following Radio Access Technologies: Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), 3GPP LTE ($3^{rd}$ Generation Partnership Project Long Term Evolution) and/or 3GPP LTE-A (LTE Advanced). For example, GSM operation can include reception/transmission in frequency ranges of about 824 MHz to about 849 MHz and about 869 MHz to about 894 MHz. EGSM operation can include reception/transmission in frequency ranges of about 880 MHz to about 914 MHz and about 925 MHz to about 960 MHz. DCS operation can include transmission/reception in frequency ranges of about 1410 MHz to about 1785 MHz and about 1805 MHz to about 1880 MHz. PDC operation can include transmission in frequency ranges of about 893 MHz to about 953 MHz and about 810 MHz to about 885 MHz. PCS operation can include transmission/reception in frequency ranges of about 1850 MHz to about 1910 MHz and about 1930 MHz to about 1990 MHz. 3GPP LTE operation can include transmission/reception in frequency ranges of about 1920 MHz to about 1980 MHz and about 2110 MHz to about 2170 MHz. Other Radio Access Technologies and/or frequency bands can also be used in various embodiments described herein. All these systems are designed to operate in a variety of bands typically known as the International Mobile Telecommunications (IMT) bands that are defined by the International Telecommunications Union-Radio Communication Bureau (ITU-R) and can, in general, be located in frequency ranges between 200 MHz and 5 GHZ within the current state of the art. It should, however, be noted that various embodiments described herein are equally applicable for any radio system, and are not restricted in any way to the IMT bands in any way.

For purposes of illustration and explanation only, various embodiments of the present invention were described herein in the context of user equipment that are configured to carry out cellular communications (e.g., cellular voice and/or data communications). It will be understood, however, that the present invention is not limited to such embodiments and may be embodied generally in any wireless communication terminal that is configured to transmit and receive according to one or more radio access technologies.

As used herein, the term "user equipment" includes cellular and/or satellite radiotelephone(s) with or without a display (text/graphical); Personal Communications System (PCS) terminal(s) that may combine a radiotelephone with data processing, facsimile and/or data communications capabilities; Personal Digital Assistant(s) (PDA) or smart phone(s) that can include a radio frequency transceiver and a pager, Internet/Intranet access, Web browser, organizer, calendar and/or a global positioning system (GPS) receiver; and/or conventional laptop (notebook) and/or palmtop (notebook) computer(s) or other appliance(s), which include a radio frequency transceiver. As used herein, the term "user equipment" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Finally, the term "node" includes any fixed, portable and/or transportable device that is configured to communicate with one or more user equipment and a core network, and includes, for example, terrestrial cellular base stations (including microcell, picocell, wireless access point and/or ad hoc communications access points) and satellites, that may be located terrestrially and/or that have a trajectory above the earth at any altitude.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, if used herein, the common abbreviation "e.g.", which derives from the Latin phrase exempli gratia, may be used to introduce or specify a general example or examples of a previously mentioned item, and is not intended to be limiting of such item. If used herein, the common abbreviation "i.e.", which derives from the Latin phrase id est, may be used to specify a particular item from a more general recitation.

Exemplary embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit such as a digital processor, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

That which is claimed:

1. A method of operating a node of a wireless communications network, the method comprising:
    transmitting information to a user equipment over an aggregated carrier that includes a primary carrier that comprises a first set of primary carrier time/frequency resources and a secondary carrier that comprises a second set of secondary carrier time/frequency resources;
    transmitting reference symbols to the user equipment on the secondary carrier less often than on the primary carrier; and
    transmitting to the user equipment over the primary carrier, an indication of when and how often the reference symbols will be transmitted to the user equipment on the secondary carrier.

2. The method according to claim 1:
    wherein the transmitting information comprises transmitting information to the user equipment over the aggregated carrier that includes a primary carrier that comprises a first set of primary carrier time/frequency resources and a secondary carrier that comprises a second set of secondary carrier time/frequency resources that are synchronized in time and frequency with the first set of primary carrier time/frequency resources; and
    wherein the transmitting reference symbols comprises refraining from transmitting reference symbols to the user equipment on the secondary carrier that comprises the second set of secondary carrier time/frequency resources that are synchronized in time and frequency with the first set of primary carrier time/frequency resources.

3. The method according to claim 2 wherein the second set of secondary carrier time/frequency resources are synchronized in time and frequency with the first set of primary carrier time/frequency resources but are offset therefrom by a constant time offset and/or a constant frequency offset, the method further comprising:
transmitting to the user equipment over the primary carrier, an indication of the constant time offset and/or the constant frequency offset, wherein the transmitting to the user equipment over the primary carrier, an indication of the constant time offset and/or the constant frequency offset comprises transmitting to the user equipment a Radio Resource Control message over the primary carrier, the Radio Resource Control message including a parameter that provides the indication of the constant time offset and/or the constant frequency offset.

4. The method according to claim 2 wherein the primary carrier and the secondary carrier are co-sited and wherein the refraining from transmitting comprises refraining from transmitting reference symbols to the user equipment on the secondary carrier.

5. The method according to claim 1:
wherein the transmitting information comprises transmitting information to the user equipment over an aggregated carrier that includes a primary carrier that comprises a first set of primary carrier time/frequency resources and a secondary carrier that comprises a second set of secondary carrier time/frequency resources that are synchronized in time with the first set of primary carrier time/frequency resources but are in a different frequency band than the first set of primary carrier time/frequency resources; and
wherein the transmitting reference symbols comprises transmitting reference symbols to the user equipment on the secondary carrier less often than on the primary carrier.

6. The method according to claim 5 wherein the transmitting reference symbols comprises transmitting reference symbols to the user equipment on the secondary carrier at a periodicity that is lower than that of the primary carrier; and the transmitting to the user equipment over the primary carrier an indication of when and how often the reference symbols will be transmitted to the user equipment on the secondary carrier comprises transmitting to the user equipment over the primary carrier, an indication of the periodicity.

7. The method according to claim 5 wherein the primary carrier and the secondary carrier are co-sited.

8. The method according to claim 1:
wherein the transmitting information comprises transmitting information to the user equipment over an aggregated carrier that includes a primary carrier that comprises a first set of primary carrier time/frequency resources and a secondary carrier that comprises a second set of secondary carrier time/frequency resources that are not synchronized in time with the first set of primary carrier time/frequency resources and that also are in a different frequency band than the first set of primary carrier time frequency resources; and
wherein the transmitting reference symbols comprises transmitting reference symbols to the user equipment on the secondary carrier less often than on the primary carrier.

9. The method according to claim 8 wherein the transmitting reference symbols comprises transmitting the reference symbols to the user equipment on the secondary carrier at a periodicity that is lower than that of the primary carrier; and
the method further comprising transmitting to the user equipment over the primary carrier, at least one indication of the periodicity of transmitting the reference symbols.

10. The method according to claim 8 wherein the primary carrier and the secondary carrier are not co-sited.

11. The method according to claim 9 wherein the at least one indication is transmitted over the primary carrier as a parameter of a Radio Resource Control message.

12. A node of a wireless communications network, the node comprising:
at least one transmitter that is configured to transmit information to a user equipment over an aggregated carrier that includes a primary carrier that comprises a first set of primary carrier time/frequency resources and a secondary carrier that comprises a second set of secondary carrier time/frequency resources;
the at least one transmitter further being configured to transmit reference symbols to the user equipment over the primary carrier;
the at least one transmitter being still further configured to transmit to the user equipment over the primary carrier, an indication of when and how often the reference symbols will be transmitted to the user equipment on the secondary carrier.

13. A method of operating a user equipment of a wireless communications network, the method comprising:
receiving information over an aggregated carrier that includes a primary carrier that comprises a first set of primary carrier time/frequency resources and a secondary carrier that comprises a second set of secondary carrier time/frequency resources;
receiving reference symbols over the primary carrier and processing the reference symbols that were received over the primary carrier; and
receiving reference symbols over the secondary carrier less often than on the primary carrier and processing the reference symbols that were received over the secondary carrier; characterized in that it further comprises
receiving over the primary carrier, an indication of when and how often the reference symbols will be received on the secondary carrier.

* * * * *

UNITED STATES PATENT AND TRADEMARK OFFICE
CERTIFICATE OF CORRECTION

PATENT NO.       : 9,572,162 B2
APPLICATION NO.  : 15/067432
DATED            : February 14, 2017
INVENTOR(S)      : Koorapaty et al.

It is certified that error appears in the above-identified patent and that said Letters Patent is hereby corrected as shown below:

On the Title Page

In item (63), under "Related U.S. Application Data", in Column 1, Line 2, delete "now abandoned." and insert -- now Pat. No. 9,629,156. --, therefor.

In item (56), under "U.S. PATENT DOCUMENTS", in Column 2, Line 2, delete "Berggren" and insert -- Berggren et al. --, therefor.

In item (74), under "Attorney, Agent, or Firm", in Column 2, Line 1, delete "Bigel, P.A." and insert -- Bigel Sibley & Sajovec, P.A. --, therefor.

On Page 2, in item (56), under "U.S. PATENT DOCUMENTS", in Column 1, Line 1, delete "Wang" and insert -- Wang et al. --, therefor.

On Page 2, in item (56), under "U.S. PATENT DOCUMENTS", in Column 1, Line 2, delete "Chin" and insert -- Chin et al. --, therefor.

On Page 2, in item (56), under "OTHER PUBLICATIONS", in Column 2, Line 42, delete "Ericcson" and insert -- Ericsson --, therefor.

On Page 2, in item (56), under "OTHER PUBLICATIONS", in Column 2, Line 52, delete "Engilsh" and insert -- English --, therefor.

On Page 2, in item (56), under "'OTHER PUBLICATIONS", in Column 2, Line 54, delete "Coiier" and insert -- Coiler --, therefor.

Signed and Sealed this
Eighteenth Day of July, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,572,162 B2

In the Drawings

In Fig. 6, Sheet 3 of 8, for Step "610", in Line 5, delete "Than," and insert -- Than --, therefor.

In Fig. 8, Sheet 4 of 8, for Step "810", in Line 6, delete "Than," and insert -- Than --, therefor.

In the Specification

In Column 1, Line 11, delete "2011;" and insert -- 2011, now Pat. No. 9,629,156; --, therefor.

In Column 5, Line 47, delete "according yet" and insert -- according to yet --, therefor.

In Column 6, Line 44, delete "cases" and insert -- cases, --, therefor.

In Column 12, Line 1, delete "Indicator" and insert -- Identity --, therefor.

In Column 13, Lines 66-67, delete "Global Standard for Mobile (GSM) communication," and insert -- Global System for Mobile Communication (GSM), --, therefor.

In Column 15, Lines 57-58, delete "(DVD/BlueRay)." and insert -- (DVD-ROM/Blu-Ray). --, therefor.

In the Claims

In Column 18, Line 5, in Claim 8, delete "time frequency" and insert -- time/frequency --, therefor.